United States Patent [19]

Assael et al.

[11] Patent Number: 4,549,211
[45] Date of Patent: Oct. 22, 1985

[54] FOUR-QUADRANT GATE-SIZING TECHNIQUE

[75] Inventors: David Assael, Thousand Oaks; Lawrence M. Ruben, Woodland Hills, both of Calif.

[73] Assignee: Hughes Aircraft Company, El Segundo, Calif.

[21] Appl. No.: 480,967

[22] Filed: Mar. 31, 1983

[51] Int. Cl.$^4$ ............................................. H04N 7/18
[52] U.S. Cl. ..................................... 358/126; 364/516
[58] Field of Search ................ 358/125, 126; 364/516, 364/517

[56] References Cited

U.S. PATENT DOCUMENTS

| | | | |
|---|---|---|---|
| 3,733,434 | 5/1973 | Weinstein | 358/126 |
| 3,769,456 | 10/1973 | Woolfson | 358/126 |
| 3,988,534 | 10/1976 | Sacks | 358/126 |
| 4,123,017 | 10/1978 | Lewis et al. | 358/126 |
| 4,189,747 | 2/1980 | Funari | 358/126 |
| 4,219,847 | 8/1980 | Pinkney et al. | 358/126 |

Primary Examiner—Howard W. Britton
Assistant Examiner—Victor R. Kostak
Attorney, Agent, or Firm—Charles D. Brown; A. W. Karambelas

[57] ABSTRACT

A four-quadrant frame of reference, established with respect to a sensed target image, effectively converts the image into a composite target regardable as the union of four, quadrant-based target-segments. Four subgates, each established within a different reference-frame quadrant, become in union a composite tracking gate. As the effectualization of the actual gate-sizing, the degree of conformity between the composite gate and the composite target is then optimized by optimizing the degree of conformity between the subgates and the associated target-segments.

13 Claims, 21 Drawing Figures

FOUR-QUADRANT GATE-SIZING TECHNIQUE

BACKGROUND OF THE INVENTION

1. Field of the Invention

The invention relates in general to imaging, gated-video tracker systems and in particular to tracking-gate sizing techniques for such systems. The invention has special relevance in those situations where it is desired to optimize tracker performance against diagonally-disposed high-aspect-ratio targets.

2. Description of the Prior Art

The conventional tracking gates of prior-art imaging, gated-video trackers have been generally rectangular in nature. When attempting to adjust the size of such a rectangular gate so as to more closely conform to the contours of a given tracked target, it has been the usual practice to adjust only the overall length and width of the gate. In other words, the conventional tracking gates have typically been limited to only two degrees of sizing freedom.

This sizing limitation has created difficulties with respect to particular kinds of targets in particular kinds of situations. The targets of concern are those whose length is significantly different from their width. The ratio of a target's length to its width, denominated its aspect ratio, provides a measure of the degree of such length-width discrepancy.

The particular processing situation of concern is that in which a high-aspect-ratio target is presented with its principal geometrical axes diagonally disposed with respect to the principal axes of the tracking gate.

Consider, for example, the situations presented in FIGS. 1 and 2. These figures show a high-aspect-ratio target in various orientations. The figures illustrate the degree to which gate-to-target conformity can be achieved using a merely rectangular gate. As can be seen from FIGS. 1a and 1b, the degree of conformity is quite good in those orientations where the principal axis 120 of the target 110 coincides with a principal axis of the gate 100, this being in the vertical orientation of FIG. 1a and the horizontal orientation of FIG. 1b. However, when the target's axis 120 is diagonally disposed as in FIG. 2, it is apparent that the degree of conformity is rather poor.

FIGS. 2a and 2b illustrate two alternative prior-art approaches to gate sizing in such a diagonality situation. The general attempt to enclose the target 110 in its entirety leads in FIG. 2a to a condition in which significant areas of the gate 200a are open to non-target-related imagery such as the indicated clutter 240. The converse attempt to eliminate the clutter 240 by restraining gate size according to considerations not directly related to actual target extent leads in FIG. 2b to a condition in which significant portions of the target image 100 are excluded from tracker processing. In many situations this can lead in turn to a tracker instability condition in which the track gate 200b tends to first oscillate along the length of the target and then eventually move off the target altogether.

It is an aim of this invention, therefore, to enhance the performance of an imaging, gated-video tracker by improving the degree of gate-to-target conformity between the tracking gate and diagonally-disposed, high-aspect-ratio targets.

An important operational context for such high-aspect-ratio diagonal dispositions in that in which the target is rotating in the field of view while being tracked. With respect to such a context, FIGS. 1a, 2a and 1b could thus be taken as a sequence of target orientations through which track is to be maintained.

It is a further general aim of this invention, therefore, to enhance the performance of an imaging, gated-video tracker with respect to a high-aspect-ratio target which rotates in the field of view while being tracked.

SUMMARY OF THE INVENTION

These and other aims are achieved by the disclosed gate-sizing method which in one of its aspects first causes a four-quadrant frame of reference to be established with respect to a sensed target-image. The reference frame effectively converts the image into a composite target regardable as the union of four, quadrant-based target-segments. Four subgates, one within each reference-frame quadrant, are established next, and the union of the four subgates becomes a composite tracking gate. As the effectualization of the actual gate sizing, the degree of conformity between the composite gate and the composite target is then optimized by optimizing the degree of conformity between the subgates and the associated target-segments.

BRIEF DESCRIPTION OF THE DRAWINGS

The aims and advantages will become apparent from a study of the following specification when considered in conjunction with the accompanying drawings in which.

Figure 8:
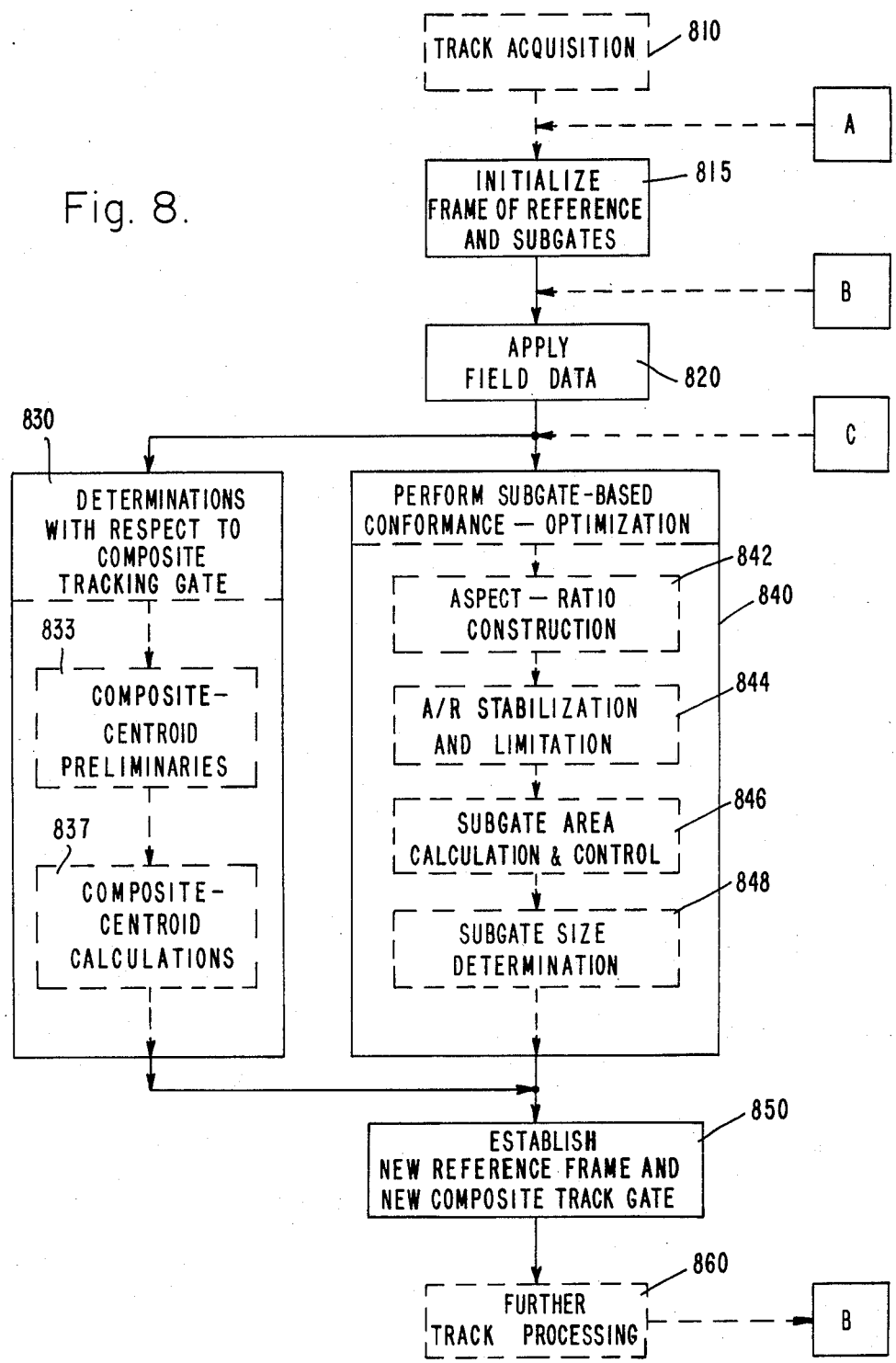
In FIG. 8 is presented an overview flowchart of an example computer program which may be utilized to implement the gate-sizing procedures of the present invention.

A more-detailed version of the FIG.-8 flow chart is presented in FIGS. 9 through 17.

DETAILED DESCRIPTION OF THE INVENTION

I. Operational Context

Figure 3:
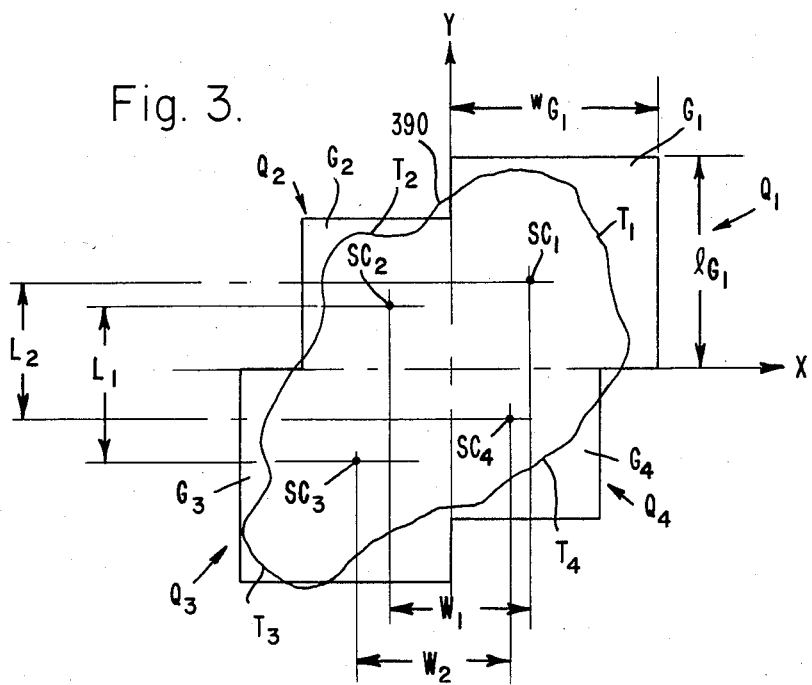
FIG. 3 illustrates a four-quadrant tracking gate formed in accordance with a preferred mode of the invention.

Included within FIG. 3 is the sensed image 390 of a target which is being tracked. This image may typically be obtained through the use of conventional sensing and imaging devices and techniques. Such devices and techniques typically provide a more-general image of a composite field of view, and the general purpose of target gating is to improve tracker performance by selecting out from the overall scene only that isolated portion of the scene in which a target of interest resides. With the approximate location of the target image within the sensed scene being otherwise ascertained, it is often further desired to adaptively adjust the size of the gated portion of the scene so as to conform as closely as possible to the contours of the given target being tracked. The present invention is directed toward the achievement of a close conformity of this nature.

II. Operational Details

A. Reference Frame

With respect to an image such as the one shown in FIG. 3, the inventive processing method begins with the establishment of a four-quadrant frame of reference at the otherwise-ascertained general location of the sensed target-image 390. It may be noted parenthetically that when establishing this reference frame in the context of a practical operational environment, several characteristics of a typical system will usually be relied upon. The first of these characteristics is that although a given currently-utilized track aimpoint is derived prior to the receipt of a presently-occurring target image, this image may in the course of ordinary tracking be expected to appear in the general scene vicinity of the previously-determined aimpoint. Because it is thus reasonable to regard the aimpoint as being generally indicative of the present target location, it is convenient to utilize the aimpoint as the reference-frame origin. When the image is then applied for gate-size processing, the indicated horizontal and vertical axes X and Y of the reference frame will effectively divide target-image 390 into the four target-segments $T_1$, $T_2$, $T_3$ and $T_4$. Following this effective division, it becomes convenient to regard the overall image 390 as having been converted, by the establishment of the reference frame, into a quadrant-based composite target made up of the union of the four target-segments.

B. Tracking Subgates

With respect to the now-established reference frame, the inventive method continues with the establishment of four tracking subgates, one within each of the reference-frame quadrants $Q_1$, $Q_2$, $Q_3$ and $Q_4$. In FIG. 3, the subgates appear as $G_1$, $G_2$, $G_3$ and $G_4$. It then becomes possible to establish a quadrant-based composite tracking gate made up of the union of these four subgates. This composite tracking gate is eventually utilized as the overall-system's tracking gate with respect to which is performed those portions of the further track processing which take place subsequent to gate-size adjustment.

C. Conformance Optimization

1. Optimization Fundamentals

Following the establishment of both the reference frame and the subgates, the inventive method reaches the point at which the actual gate sizing may be performed with respect to the given sensed image. For the purpose of optimizing the degree of conformance between the overall-system tracking gate and the given image—an objective which has now been effectively transformeed into the optimizing of the degree of conformance between a composite tracking gate and a composite target image—the inventive method optimizes the degree of conformance between the subgates and the associated target-segments. As a result of this quadrant-and-subgate-based conformance-optimization technique, the degree of conformity between the composite system tracking gate and diagonally-disposed, high-aspect-ratio targets is significantly enhanced.

2. Preferred Constraints a. Aspect-Ratio Equality

It has been found that the performance of an overall tracking system in which the inventive method may be utilized may be further enhanced when the subgate-to-segment conformance-optimization for a given image is performed in accordance with one or more of a sequence of constraints. The first of these constraints concerns the aspect ratios of the individual subgates. It will be recalled that the aspect ratio of a given object is a conventional mathematical entity which is defined as the ratio of a predetermined one of an object's rectalinear dimensions to the predetermined other one of its dimensions. The ratio provides a convenient mechanism for quantifying the relative relationship between these two dimensions. For the sake of further expositional convenience throughout this specification, the specific predetermined mathematical ratio form which is being utilized is that of the ratio of the object's length to its width. With respect to the reference frame established as illustrated in FIG. 3, an aspect ratio may, for example, be seen with regard to subgate $G_1$ as being the ratio of the subgate's vertical length $^lG_1$ to its horizontal width $^wG_1$. The first of the optimizing constraints may then be stated as the stipulation that in conformance-optimizing the subgates with respect to their associated target-segments, the aspect-ratios of all four of the subgates are to remain the same.

In view of an aspect-ratio's above-referred-to nature as a quantification mechanism, this constraint may be equivalently stated as being the stipulation that in conformance-optimizing the subgates with respect to their associated target-segments, the relative relationship between the dimensions of each of the given-image's four subgates be kept the same as the relative relationship between the dimensions of each of the other three subgates of that image.

From the standpoint of parenthetical clarification, it may be noted that this constraint is typically more in the nature of a locally-imposed, intra-image restriction as opposed to being a global, inter-image stipulation. This is, in the typical tracking situation where, as will be further discussed below, each of a sequence of target images is presented for inventive processing, the first constraint relates the aspect ratio of a given subgate to the ratios of the other subgates of only the currently-processed image. The constraint is to be distinguished from a requirement that the aspect ratios of each of the subgates of a currently-processed image must necessarily be kept the same as those of some other one of the processed images. Thus, even though on an intra-image basis the constraint itself imposes a uniformity condition, and even though on an inter-image basis there would typically be the consistency of applying the same constraint to each image's subgate-sizing operation, it is to be understood that there is no preferred intention for either the uniformity or the consistency to imply in themselves a mandatory stipulation regarding an image-to-image aspect-ratio dependence during subgate sizing. It will become apparent that analogous local-versus-global considerations apply with respect to the remaining constraints.

b. Composite Aspect Ratio

The second of the optimizing constraints concerns the maintenance of a degree of proportionality between a given target image as generally distributed with respect to the established reference frame and the subgates which are to be conformed to this image distribution. An understanding of the constraint begins with the consideration of three inherent properties of the applied image.

As will be further discussed below, every such image possesses, first, an intrinsic aspect ratio, as well as, second, a determinable major axis. When the image is applied within the reference frame, the major axis in turn gives rise to a likewise-determinable rotational orientation with respect to the reference frame. As will also be discussed below, these inherent properties in turn inherently give rise to an effective aspect ratio regardable as the projection into the established reference frame of the rotationally-oriented composite target.

In practicing the invention subject to the second of the optimizing constraints, a determination of this effective ratio is made. The resulting effective ratio is regarded as a composite aspect ratio of the composite target with respect to the overall frame of reference and is then utilized as the central feature of the second of the constraints. The constraint itself is that the subgates' individual aspect-ratios, which in accordance with the first constraint may be kept equal to each other, are, in addition, to be kept equal to this composite aspect ratio.

A further understanding of the nature of this projected ratio begins with the consideration of a given image's intrinsic aspect ratio. Those skilled in the art will recognize that the intrinsic aspect ratio of operationally-occurring images which typically possess irregular contours can in a strict mathematical sense be ascertained in a number of specific ways. For example, the intrinsic ratio could be taken as the aspect ratio of a particular kind of generalized geometrical shape which has been least-squares fitted to the given image. The general prerequisites for this shape would be that it have adjustable size and adjustable orientation, with the size usually being a function of an adjustable overall length and width. Geometrical shapes possessing these characteristics will typically be ordinary rectangles or ellipses.

When the intrinsic ratio is viewed in terms of a fitted geometrical shape of this nature, it then becomes convenient to define the given image's associated major axis as being that which coincides with the major geometrical axis of the fitted shape when the shape is oriented in a manner which minimizes the moment of inertia of the target image about this major axis. It may be observed that in the case of a generalized shape of the type specified above, this "smallest-moment" axis would simply coincide with the shape's major geometrical axis once the shape has been least-squares fitted. The given image's effective rotational orientation within the established reference frame could then become the intra-frame rotational orientation of this minimum-moment axis.

In a more-formal mathematical sense of this nature, the composite aspect ratio could be viewed as a measure of the rotationally-oriented, fitted shape's effective orthogonal distribution relative to the reference frame. A conventional mathematical mechanism which may be used to more-specifically define this effective distribution is the concept of projection. In terms of this concept, the composite aspect ratio may be viewed as the projection of the intrinsic aspect ratio into the new frame of reference. One manner in which this projection could be accomplished would be by taking the conventional projection onto the new reference frame's orthogonal axes of the fitted geometrical shape with its given orientation. In practical effect, this process would tend to make the composite aspect ratio the same as the intra-frame aspect ratio of a rectangular gate which has been conventionally fitted to the given image. It will be apparent that the length and width of this fitted rectangle will be respectively equivalent to the maximal vertical and horizontal extent of the oriented, least-squares-fitted geometrical shape as projected into and measured within the new coordinate system.

It may be further observed that this projected composite aspect ratio is a suitable criterion for conformance optimization because, in general, it is to be expected that the subgates will have to be sized according to actual target extent, and because, in particular, it is important to maintain the same proportionate relationship between the dimensions of the affected subgates as that which exists between the dimensions of the target image as maximally-projected within the orthogonal reference frame. If the target thus tends to be vertically extended (i.e., high effective aspect ratio), conforming subgates would be expected to be likewise vertically extended. Similarly, if the target were horizontally distributed, so, too, would be the conforming subgates.

Figure 1A:
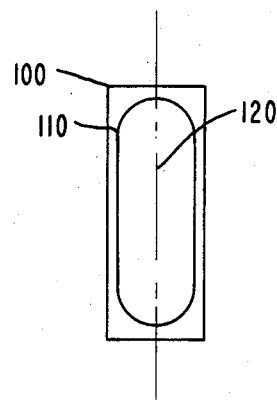
FIGS. 1a and 1b illustrate the performance of a conventional rectangular tracking gate with respect to a high-aspect-ratio target which is first vertically and then horizontally disposed.
Figure 1B:
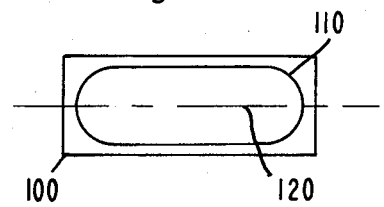
Figure 2A:
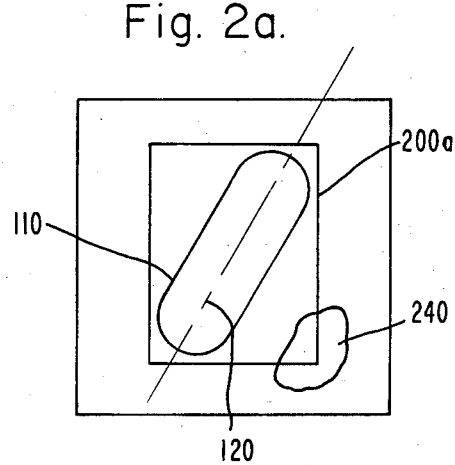
FIGS. 2a and 2b illustrate the limitations inherent in two conventional approaches to the sizing of a rectangular tracking gate with respect to a diagonally-disposed, high-aspect-ratio target.
Figure 2B:
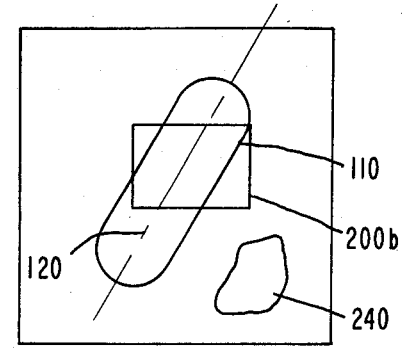

As an example of these considerations, assume that the schematic target 110 of FIGS. 1 and 2 possesses an overall length of 3 units and a width of 1 unit. The target wouldd thus possess an intrinsic constant aspect ratio of three. Applying the concepts discussed above would produce a resulting composite aspect ratio that would vary from 3 for the 90° vertical orientation of FIG. 1a, to 1 for the 45° diagonal orientation of FIG. 2a, and then to $\frac{1}{3}$ for the 0° horizontal orientation of FIG. 1b.

It is to be noted that although explicit mathematical relations for the computation of the composite aspect ratio will subsequently be presented in this specification, it is to be understood that these relations are merely exemplary techniques in accordance with which the desired ratio-determination may, for convenience, be carried out with practical efficiency in an actual operational environment.

c. Specific Ratios
i. Preferred Form

The third of the conformance-optimization constraints thus relates to a specific mathematical relation in accordance with which the composite aspect ratio may be determined. This particular mathematical relation involves the intra-quadrant centroids of those target-segments that are contained in particularly-specified pairs of the established subgates. For the purpose of defining this specific mathematical form, the quadrants and their associated subgates are accordingly identified as two pairs of vertically-juxtaposed quadrants and subgates and as two pairs of horizontally-juxtaposed quadrants and subgates. With respect to the situation illustrated in FIG. 3, the vertically-juxtaposed quadrant pairs are right-hand quadrants $Q_1$ and $Q_4$ and left-hand quadrants $Q_2$ and $Q_3$. The associated subgates $G_1$ and $G_4$, together with $G_2$ and $G_3$, become the corresponding vertically-juxtaposed subgate pairs. Similarly, the horizontally-juxtaposed quadrants and subgates become on one hand the first and second upper quadrants $Q_1$ and $Q_2$, together with the associated subgates $G_1$ and $G_2$, and on the other hand the third and fourth lower quadrants $Q_3$, $Q_4$, together with the associated subgates $G_3$ and $G_4$.

In carrying out this aspect of the invention, conventional techniques may be utilized to compute the intra-quadrant centroid of each of the target-segments, with the individual centroids being identifiable as localized, segment-centroids $SC_1$, $SC_2$, $SC_3$ and $SC_4$.

As the next part of the specific computation, the vertical distances, indicated in the example situation of FIG. 3 as $L_1$ and $L_2$, between the centroids of each of the vertically-juxtaposed subgate pairs, as well as the analogous horizontal distances, llustrated in FIG. 3 as $W_1$ and $W_2$, between the centroids of each of the horizontally-juxtaposed subgate pairs, are first ascertained. A determination is then made of the sum of the two vertical distances, as well as the sum of the two horizontal distances.

The specific aspect ratio, in accordance with which the conformance-optimization is constrained in this phase of the invention to be carried out, then becomes the quantity which results from dividing the vertical-distance sum by the horizontal-distance sum.

ii. Alternative Forms

Figure 4:
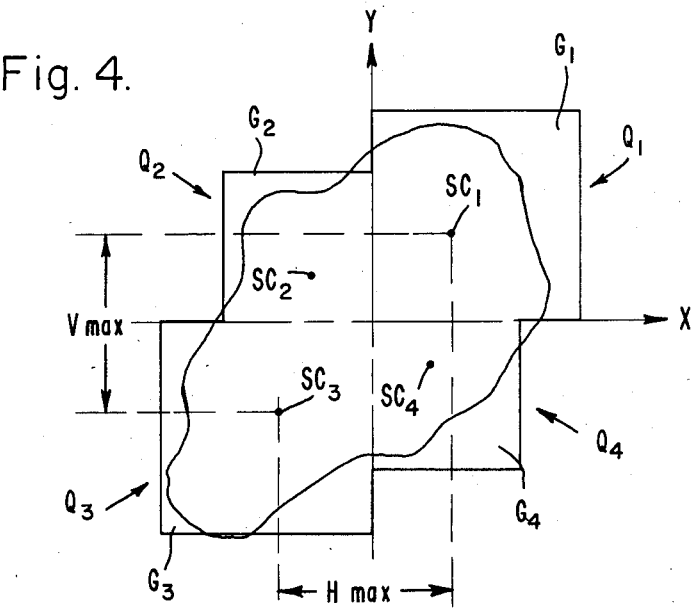
FIGS. 4 and 5 illustrate alternative measures which may be utilized to derive the composite aspect ratio employed in a preferred mode of the invention.
Figure 5:
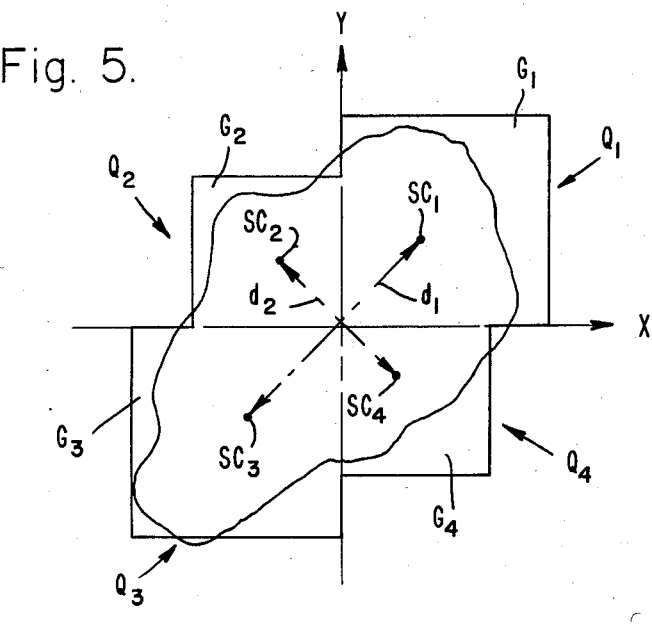

Included among the alternative specific mathematical relations in accordance with which the composite aspect ratio may be computed are two quantities which are determined in accordance with the relations respectively illustrated in FIGS. 4 and 5. In both of these figures the local segment-centroids $SC_1$, $SC_2$, $SC_3$ and $SC_4$ are determined as was done in the course of the previously-described computation. In contrast with the previous computations, however, the first of the alternative composite aspect ratios requires a determination of both the maximum vertical distance between any two of the local centroids and the maximum horizontal distance between any two of these centroids. For the particular example target presented in FIG. 4, the vertical distance between $SC_1$ and $SC_3$ is greater than the vertical distance between the members of any of the other possible pairs of segment-centroids and thus becomes the indicated $V_{max}$ which is utilized for composite-aspect-ratio purposes. Similarly, the horizontal distance between this same pair of segment-centroids is for the illustrated target image greater than the horizontal distance between the members of any other possible pairing of segment-centroids and becomes the designated $H_{max}$ also used for the aspect-ratio computation. Once these maximum distances have been determined, the composite aspect ratio is made to be the quantity which results from dividing the vertical maximum by the horizontal maximum.

For this purpose of defining the second of the alternative quantities which may be utilized for the computation of the composite aspect ratio, the quadrants and their associated subgates are identified as two pairs of diagonally-disposed quadrants and subgates. With respect to the situation illustrated in FIG. 5, the diagonally-disposed pairs are seen to be on one hand quadrants $Q_1$ and $Q_3$, together with the associated subgates $G_1$ and $G_3$, and on the other hand quadrants $Q_2$ and $Q_4$, together with the associated subgates $G_2$ and $G_4$. Following the determination of the indicated local segment-centroids, this particular form of the aspect-ratio computation requires that a determination be made of the centroid-to-centroid distances between the local centroids of diagonally-disposed subgates. In FIG. 5 these diagonal distances are indicated as $d_1$ and $d_2$. The specific composite aspect ratio then utilized is the quantity which results from dividing a predetermined one of the diagonal-centroid distances by the predetermined other one of the diagonal distances. For convenience, $d_1$ may be taken as the predetermined first diagonal distance, with $d_2$ then becoming the predetermined other one of the diagonal distances.

It is to be noted that the composite aspect ratio computed on the basis of the ratio between the previously-described length sums and width sums is preferred because it was found with respect to one overall system to yield tracker performance which was superior to that achieved through the use of the two described alternative mathematical relations.

d. Additional Constraints

In addition to the constraints concerning subgate-aspect-ratio equality, concerning the use of a single composite aspect ratio to which the subgate aspect ratios are made equal, and concerning the particularized form of the composite-aspect-ratio computation, the invention in its preferred form is carried out in accordance with several further constraints. Thus, as a fourth constraint, the areas enclosed by the diagonally-disposed subgates are made to remain equal.

A fifth constraint controls the relationship between subgate area and the area of the target-segment enclosed within that subgate. This constraint is that during the course of the conformance-optimization, the subgate areas are to be adjusted so that the sums of the areas of the target-segments in diagonal subgates remain a predetermined optimizing fraction K of the sums of the areas of the associated diagonal subgates. This constraint is in the nature of a proportionality control whose purpose is to ensure that the subgates are neither too large to provide meaningful clutter-minimizing conformity to the associated segments nor too tightly fitted to safely encompass irregular projections of the segment.

It has been determined that the optimizing fraction K will typically lie between about 0.4 and about 0.8. The specific value to be utilized in any given instance will usually be ascertained empirically in the light of the particular characteristics of both the tracking system to be employed and the intended operational environment.

3. Constraint Summary

The constraints in accordance with which the inventive conformance-optimization is carried out in its preferred manner with respect to a given target image may be summarized by means of the following relations:

$$AR_{G1} = AR_{G2} = AR_{G3} = AR_{G4}; \quad \text{(a)}$$
$$AR_{Gi} = AR_{CG} \text{ for } i = 1 \text{ to } 4; \quad \text{(b)}$$
$$AR_{CG} = \frac{L_1 + L_2}{W_1 + W_2}; \quad \text{(c)}$$
$$GA_1 = GA_3 \text{ and } GA_2 = GA_4; \quad \text{(d)}$$
$$\Sigma(SA_1 + SA_3) = K \cdot [(GA_1 + GA_3)]; \quad \text{(e)}$$
$$\text{and}$$
$$\Sigma(SA_2 + SA_4) = K \cdot [\Sigma(GA_2 + GA_4)];$$

where
(i) $AR_{Gi} = l_{Gi}/w_{Gi}$, the length-to-width aspect ratio of the ith subgate;
(ii) $AR_{CG}$ = the composite-gate-to-aspect-ratio measure of composite target distribution within the quadrant-based reference frame;
(iii)
$L_1$ = the vertical distance between the left-hand-quadrant centroids;

$L_2$ = the vertical distance between the right-hand-quadrant centroids;
$W_1$ = the horizontal distance between the upper-quadrant centroids; and
$W_2$ = the horizontal distance between the lower-quadrant centroids;

(iv)

$SA_i$ = the intra-quadrant area of the ith target-segment;

(v)

$GA_i$ = the enclosed gate area of the ith subgate; and (vi)

K typically lies within the interval from about 0.4 to about 0.8.

In an analogous fashion, the specific mathematical relations in accordance with which the composite aspect ratio may alternatively be calculated are as follows:

$$AR_{CG} = \frac{V_{max}}{H_{max}} ; \text{ and} \quad (c')$$

$$AR_{CG} = \frac{d_1}{d_2} ; \quad (c'')$$

where (iii')

$V_{max}$ = the maximum vertical distance between any pair of local centroids, and
$H_{max}$ = the maximum horizontal distance between any pair of local centroids; and (iii'')

$d_1$, $d_2$ = the diagonally-measured distances between diagonally-disposed centroids.

4. Alternative Constraints

In addition to the variations concerning the specific form of the composite-aspect-ratio computation, there exist alternatives to other ones of the preferred constraints in accordance with which conformance-optimization may be achieved. Although some of these additional alternatives will be listed below, it should be noted preliminarily that conformance-optimizations carried out in accordance with various combinations of the available alternative constraints were found with respect to one system to yield tracker performance which was not as stable as that achieved through the use of the above-described preferred collection of constraints.

The alternative constraints in accordance with which the conformance-optimization may be carried out thus include the following:

(1) Instead of stipulating that the aspect ratios of all the subgates be the same, the aspect ratios may be constrained on a diagonal-pair basis only. That is, the conformance-optimization may be performed subject to the requirement that the aspect-ratios of only diagonally-disposed subgate pairs be made to remain equal.

(2) The subgates may be sized independently from each other, thus dispensing with any or all of the previously-discussed sizing-constraint requirements.

It may be noted, however, that these particular two alternatives give rise to a number of supplemental considerations.

a. Diagonal Aspect Ratio

With respect first of all to the diagonally-referenced aspect-ratio constraint, it is possible to additionally define a diagonal aspect ratio and to further stipulate that the now-equal aspect ratios of the diagonally-disposed subgates are constrained during conformance-optimization to remain equal to this diagonal ratio.

Each of the diagonal ratios may be obtained in accordance with considerations analogous to those discussed above concerning the composite aspect ratio. The previously-discussed considerations need only be modified to take into account the principal distinction that the relative target-image areas with respect to such diagonal-aspect-ratio determinations will now be made are only the paired, diagonally-disposed target-segments. Thus, in contrast with the composite-aspect-ratio computations, where the target distribution over all four quadrants was taken into account, the target-image as separately distributed over only two diagonally-disposed quadrants will be evaluated in arriving at each of the diagonal ratios. For each of the pairs of diagonal segments, therefore, the ratio will be obtained by determining the paired-segment's effective aspect ratio as projected into the established reference frame.

In terms of the more-specific geometrical approach described previously, the theoretical aspects of a given one of the diagonal-aspect-ratio derivations could for example be viewed as involving the least-squares fitting of an ellipse around only that much of the target-image which was distributed over a given pair of diagonally-disposed quadrants. In similarly-analogous practical effect, a given one of the diagonal aspect ratios could be taken as being equivalent to the intra-reference-frame aspect ratio of a rectangular gate conventionally fitted to only that much of the target as was distributed over the associated diagonally-disposed quadrants. Once again, although a specific manner of computing the diagonal ratios will now be presented, it is to be understood that this technique is merely exemplary and was formulated primarily in the interest of practical computation efficiency.

Thus, as an additional constraint in this particular aspect of the conformance-optimization, it may be stipulated that the diagonal aspect ratios are to be determined in the following specific manner: First, within each quadrant, the centroid of the associated target-segment is determined and is then regarded as a local centroid for that quadrant. Second, for each of the two diagonal lines intersecting the now diagonally-disposed centroids of diagonally-disposed target-segments, a determination is made of these lines' slopes. Third, each diagonal aspect ratio is then made equal to the magnitude of the slope of the centroid-intersection line of the associated diagonal-target-segment pair.

b. Independent Sizing

With respect secondly to the independent-sizing consideration, and by analogy to the "K" factor discussed previously, it is to be noted that even independently-sized subgates will be subject to a proportionality control so as to ensure an appropriate degree of conformity to the associated target-segments. It is to be further noted, however, that it nevertheless follows from the independent nature of this situation's sizing that there would not necessarily be made to exist a cross-subgate dependent relationship between whatever proportionality constraints are imposed.

D. Further Track Processing

Once the intra-quadrant size of each of the individual subgates has been determined in accordance with the conformance-optimization of the present invention, the union of the four resulting subgates becomes the composite gate which is then utilized as the system tracking gate with respect to which the further track processing of the overall imaging tracker is performed. This processing may proceed by utilizing the conformance-optimized composite track gate to determine, as a composite centroid, the centroid of that portion of the composite target image contained within the optimized composite gate. The resulting composite centroid may then be utilized as an updated aimpoint for the overall system.

It may be noted that once the composite gate is formed in accordance with the inventive method and once there has been a designation of which portion of the applied target image is to be evaluated for the determination of the composite centroid, the centroid computation itself may be performed in accordance with conventional centroiding procedures.

It may also be noted that because a typical imaging-tracker system generates and analyzes a sequence of target images, the complete inventive method, together with the typically-associated track processing, would usually be performed repetitively, once for each image in the sequence. Consequentially, in addition to the composite centroid being utilized as an updated aimpoint for the overall tracking system, the centroid derived from the conformance-optimization performed on a given image may in such sequential situations be utilized also as the origin for a new frame of reference with respect to which a subsequently-presented image may be analyzed for conformance-optimization purposes.

It may be noted further that another consequence of this sequential image analysis would be the generation of an associated sequence of conformance-optimized composite tracking gates, each given one of which, as will be further described below, may analogously be utilized in the processing of a given predetermined one of the subsequently-presented images. The similarly-associated sequence of composite centroids would in a typical system be used for updating the aimpoint on an iterative basis.

III. Operational Combinations

The invention may be practiced subject to various combinations of the described individual constraints. A number of these combinations, including the preferred one, will be summarized here:

(#1) As a point of reference, it will be recalled that the basic form of the inventive method involves the described steps of (a) reference-frame establishment, (b) subgate establishment and (c) subgate-to-segment-based conformance-optimization.

(#2) The conformance optimization of the method form of (#1) may be carried out subject to the described constraint concerning the maintenance of aspect-ratio equality among all four subgates.

(#3) The method form of (#2) may include the described step of utilizing the composite target's effective projected aspect ratio as a composite aspect ratio, after which there may be imposed the described conformance-optimization constraint concerning the maintenance of a condition of equality between this composite asepct ratio and the individual aspect ratios of all four subgates.

(#4) The method form of (#3) may include the described steps of (a) intra-quadrant, local-centroid determination, (b) juxtaposed vertical-and-horizontal centroid-distance determinations and summations and (c) composite-aspect-ratio calculation through juxtaposed vertical-by-horizontal summed division.

(#5) The method form of (#3) may include the described steps of (a) intra-quadrant, local-centroid determination, (b) maximum vertical-and-horizontal centroid distance determination and (c) composite-aspect-ratio calculation through maximum vertical-by-horizontal distance division.

(#6) The method form of (#3) may include the described steps of (a) intra-quadrant, local-centroid determination, (b) diagonal-centroid-distance determination and (c) composite-aspect-ratio calculation through diagonal-distance division.

(#7) The conformance-optimization of the method form of (#1) may be carried out subject to the described constraint concerning the maintenance of aspect-ratio equality in diagonally-disposed subgates.

(#8) The method form of (#7) may include the described step of utilizing, as respective diagonal aspect ratios, the effective projected aspect ratios of diagonally-paired target-segments, after which there may be imposed the described conformance-optimization constraint concerning the maintenance of a condition of equality between these respective diagonal ratios and the individual aspect ratios of each of the subgates of the associated diagonal-gate pairs.

(#9) The method form of (#8) may include the described steps of (a) intra-quadrant, local-centroid determination, (b) diagonal-intersection-line slope determination and (c) establishment of an equivalence between the diagonal aspect ratios and the respective magnitudes of the intersection-line slopes.

(#10) The method form of (#1) may be carried out in accordance with the described independent-sizing considerations.

(#11) The conformance-optimization of the method from (#11) may be carried out subject to the described constraint concerning the maintenance of area equality in diagonally-disposed subgates.

(#12) The conformance-optimization of the method form (#1) may be carried out subject to the described constraint concerning the maintenance of an optimizing-fraction-K relationship between the sums of diagonally-disposed target-segment areas and associated subgate areas.

(#13) In the conformance-optimization of the method form (#12), the optimizing-fraction K may be more particularly specified as being a number which lies between about 0.4 and about 0.8.

(#14) As an additional step in the method form (#1), there may be performed the described determination of a composite centroid of the composite target within a composite gate which has been conformance-optimized with respect to a given applied composite target itself.

(#15) As an additional aspect of method form (#14), the subject tracking system may be one which generates the described sequence of target images and the method is to be practiced upon substantially each of the images in sequence.

(#16) As an additional aspect of the method form (#1), (a) the subject tracking system may be one which generates the described sequence of target images and the method is to be practiced upon substantially each of the images in sequence, (b) the method includes the described step of determining, as a composite centroid with respect to a conformance-optimized composite tracking gate, the centroid of that portion of the composite target image contained within the optimized composite gate and (c) the optimized composite gate utilized for the composite centroiding of a given one of the sequential images is that which was derived using a previous image in the sequence.

(#17) As an additional aspect of the method form (#16), the optimized composite gate utilized for the composite centroiding of a given one of the sequential images is that which was derived using the immediately-previous image in the sequence.

(#18) As an additional step of any of the method forms (#14) through (#17), there may be the above-described utilization of the composite centroid as an updated track aimpoint.

(#19) As an additional step for any of the method forms (#14) through (#18) in the described situations of sequential image processing, there may be the above-described utilization of the composite centroid as the origin for a new conformance-optimization reference frame.

IV. Operational Example

Figure 7:
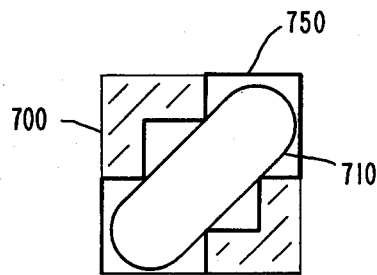
FIG. 7 represents the superposition of the rectangular tracking gate of FIG. 2a onto the four-quadrant gate of FIG. 6b and graphically illustrates the degree of improvement achievable through the use of the inventive sizing method.
Figure 6C:
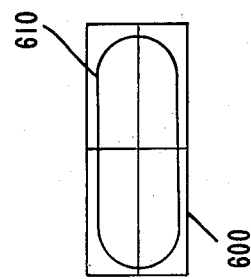
FIGS. 6a, 6b and 6c illustrate the performance of one form of the inventive four-quadrant tracking gate with respect to a high-aspect-ratio target as the target rotates from a vertical orientation, through a diagonally-disposed orientation, to a horizontal orientation.
Figure 6B:
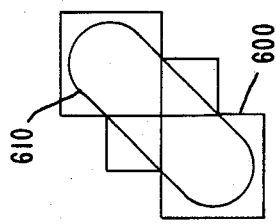
Figure 6A:
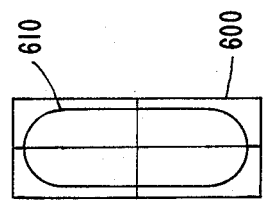

FIG. 6 demonstrates the effectiveness of the inventive sizing technique with respect to a rotating, high-aspect-ratio target. While FIGS. 6a and 6c show that when the target 610 is either vertically or horizontally-disposed the inventive technique provides tracking capability which is as good as that achievable through the use of conventional rectangular tracking gates, FIG. 6b shows the improved target-to-gate conformity which the new gate 600 makes possible. The degree of improvement is graphically apparent from FIG. 7, which represents the superposition of the rectangularly-sized gate of FIG. 2a onto the quadrantly-sized gate of FIG. 6b, for the situation in which the target 710 is again diagonally-disposed. The eliminated gate regions and hence the reduction in clutter susceptibility between the rectangular gate 700 and the four-quadrant gate 750 are readily apparent.

V. Operational Particularization

Presented in this section will be some terminological comments concerning the more-specific manner in which the present inventive method may be carried out in an actual operational environment. As is well known, the typical practice in the video and televison arts is for a complete video picture, designated a "frame," to be formed by means of an interleaved superposition of a plurality of images called "fields." Each of the fields is obtained by scanning the entire scene of interest at a scan-line resolution which is less than that of the eventual complete frame. In the typical situation where two fields are utilized for frame formation, the line resolution of each component field is one-half that of the composite frame, and with respect to each other, the fields are mutually-offset, typically by half of one line spacing. The resulting frame and hence resulting complete image is formed by interleaving the half-resolution lines of the two mutually-offset fields.

With respect to a composite-frame imaging process of this nature, the present inventive gate-sizing may advantageously be performed on each field separately, rather than on the final frame itself. Practiced in this fashion, the invention would in effect be simply the treatment of each of the successively-generated fields as a separate image, with the outcome of the gate-sizing as performed on any given field being utilized as the starting point for an independent gate-sizing performed with respect to the next subsequent field, regardless of whether any such next subsequent field would be that which would be pair-wise utilized together with the most-recently-processed field in the formation of a common frame.

Thus, even though throughout the specification the inventive gate-sizing is being described with respect to such terminological contexts as "images" and "scenes" generally, and even though it will be apparent that the gate-sizing method of the present invention is not restricted to images obtained in the conventional "fields and frames" manner and may readily be practiced on images obtained from a variety of sources by means of alternative techniques, the "image" and "scene" terms will be understood to encompass a more-specific actual practice of the invention with respect to the successive fields typically utilized in the video and television arts. This more-specific aspect of the invention will be seen again below in the course of the description of a computer-program implementation for the inventive gate-sizing technique.

VI. Operational Realization

A. Preliminary Considerations

For use with an actual tracking system, the gate-sizing procedures of the present invention would typically be implemented in computer-program form. It is to be noted in particular that the conformance-optimization process of deriving the actual sizes of each of the subgates would typically become a iterative operation carried out in accordance with some combination of the identified constraints.

In view of the above-presented detailed description, the implementation in computer-program form of the subject inventive video-processing procedure is regarded as a relatively-straightforward matter well within the ordinary skill of the art. Nevertheless, there is presented in overview form in FIG. 8 and in more-detailed form in FIGS. 9 through 17 a flow chart for an actual computer program in accordance with which the preferred version of the inventive procedure has been practiced. Both the overview and detailed forms of the flow chart will be discussed below.

It will become apparent during the course of the flow-chart discussion that the presented chart was tailored in accordance with the particular requirements of one operational situation of interest, an operational situation which included not only the two-fields-per-frame sensing format previously discussed but also other specialized constraints. It will consequentially become apparent that the diverse requirements of the various alternative environments in which it is possible to practice the invention may necessitate program adaptations in order to achieve optimized operationality in those environments. It is to be understood, therefore, that the program as flow-charted is merely exemplary.

As an additional preliminary to the program discussion, it may also be noted that there may at times be a tradeoff between tracking optimization in an abstract sense on one hand and processing efficiency in a practical sense on the other. This tradeoff may in itself prompt the implementation of various kinds of adaptations.

For example, in the above Section II, D, entitled "Further Track Processing," there was presented a discussion of a possible processing sequence in which, for the typical situation of track processing with respect to each of a series of target images, the composite centroid determination for a given image follows, and hence utilizes the results of, the subgate-sizing procedure which is carried out with respect to that very same image. This processing sequence is "optimum" in that the composite centroiding and consequential aimpoint updating and new-origin establishment are performed on the basis of the composite track gate which is derived using the most-recently-optimized set of subgates.

In certain circumstances, however, the attractiveness of this advantageous consistency between the composite gate itself and the image initially used for the gate's derivation can be offset by the efficiency of certain types of "parallel" processing. As proved to be the case in the actual operational situation in which the invention was implemented, and hence as will be described in the course of the following discussion, processing delays were avoided by a concurrent computational sequence in which the composite centroiding with respect to a *presently*-processed image was performed on the basis of a composite gate obtained as a consequence of the conformance-optimization carried out with respect to a *previously*-processed image. Because the resulting gain in computational speed enhanced tracker performance to an extent which was significantly greater than any degradation due to the discrepancy between the centroiding gate and the centroided image, this modified track-processing format was deemed to be the preferred mode for that particular operational environment.

B. Program Discussion

In the overview flow chart of FIG. 8, the computer program implementation is presented in outline form. Following track acquisition schematically represented at box 810, processing would begin at box 815 with the initialization of the frame of reference and the individual subgates. At box 820 the first set of field data is then applied.

In boxes 830 and 840 are respectively presented the basic sequences for composite-tracking-gate calculations and for the conformance-optimization itself. Because the composite-tracking-gate calculations are conveniently performed with respect to the most-recent previously-optimized gate, these calculations may be performed in parallel with the actual conformance-optimization of a given presently-applied field. Nevertheless, in the actually-implemented computer program, these composite calculations were performed in a non-parallel fashion and are here represented in parallel merely for the sake of expositional convenience.

In the composite determinations of box 830, there are first performed at box 833 various preliminary calculations, which are then followed by the actual composite-centroid calculation itself at box 837.

In box 840, the conformance-optimization begins at box 842 with the construction of the aspect ratio which is then stabilized and appropriately limited at box 844. The applied field data is used in conjunction with the now-calculated aspect-ratio to calculate at box 846 the areas of the individual subgates. These areas are then subjected to dimensional-control procedures for the sake of tracking stability. At box 848, the aspect ratio and calculated areas are then used to determine the resulting subgate sizes.

The subgate sizes from box 840, together with the composite centroid from box 830, are utilized at box 850 to establish a new reference frame and a new composite tracking gate with respect to which further track processing is then performed as schematically indicated by box 860.

Figure 9:
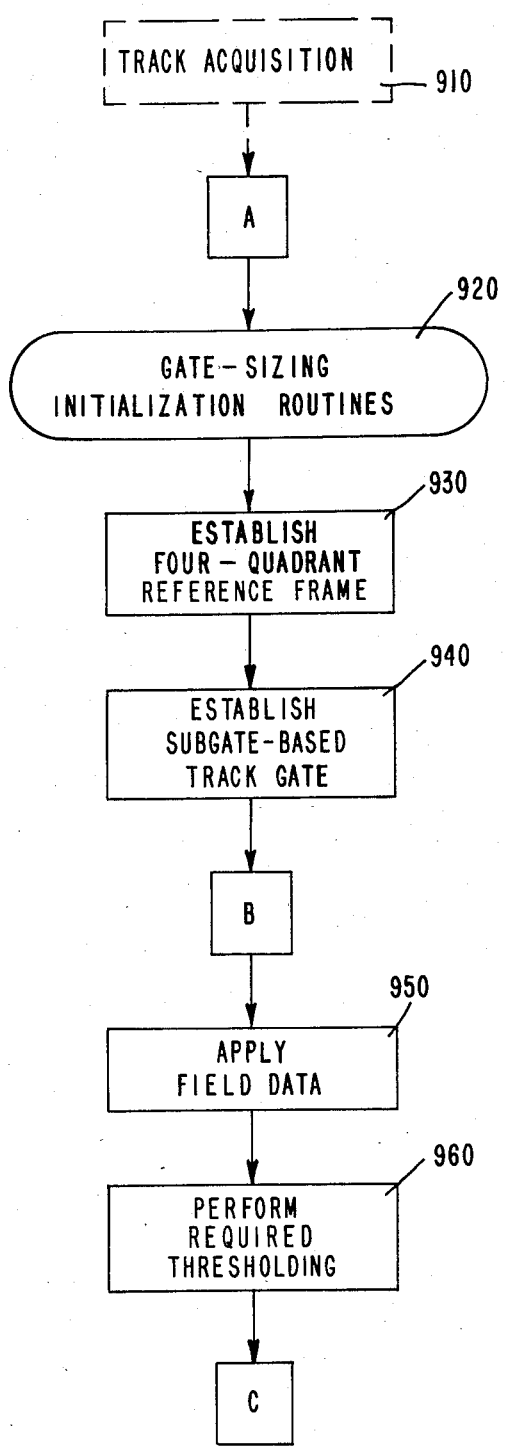

The detailed flow chart begins in FIG. 9 with track acquisition schematically represented at box 910. Such acquisition, which may be accomplished in a conventional manner and is hence not a part of the present invention, would inherently provide an initial track aimpoint. At "A" the gate-sizing initialization routines would begin following header 920. At box 930, the initial track aimpoint would be utilized as the origin of a four-quadrant reference frame which would now be established. At box 940, the subgate-based, four-part composite track gate is established within the reference frame. By analogy to conventional gate-initialization procedures, the initial subgates would be made of equal dimension, thus resulting in an initial composite gate which is a square. The size of the subgates would be adjusted so that the composite gate would conform to a minimum-sized target. Also in accordance with conventional tracking design, this initial minimum size would be an empirically-determined function both of the a-priori-known dimensions of the targets of interest and of the likewise a-priori-known maximum acquisition ranges.

At point "B" of the program, the field data to be processed is applied as indicated by box 950. The conventional process of pre-analysis image thresholding is performed at box 960. As is well known to those skilled in the art, such thresholding would typically involve determining the average value of the image intensity contained within the given composite track gate, after which the applied image is converted to a bi-level representation in which image intensities below the threshold are cancelled while those above the threshold are given some uniform value. All subsequent processing would be performed with respect to this bi-level image.

Figure 10:
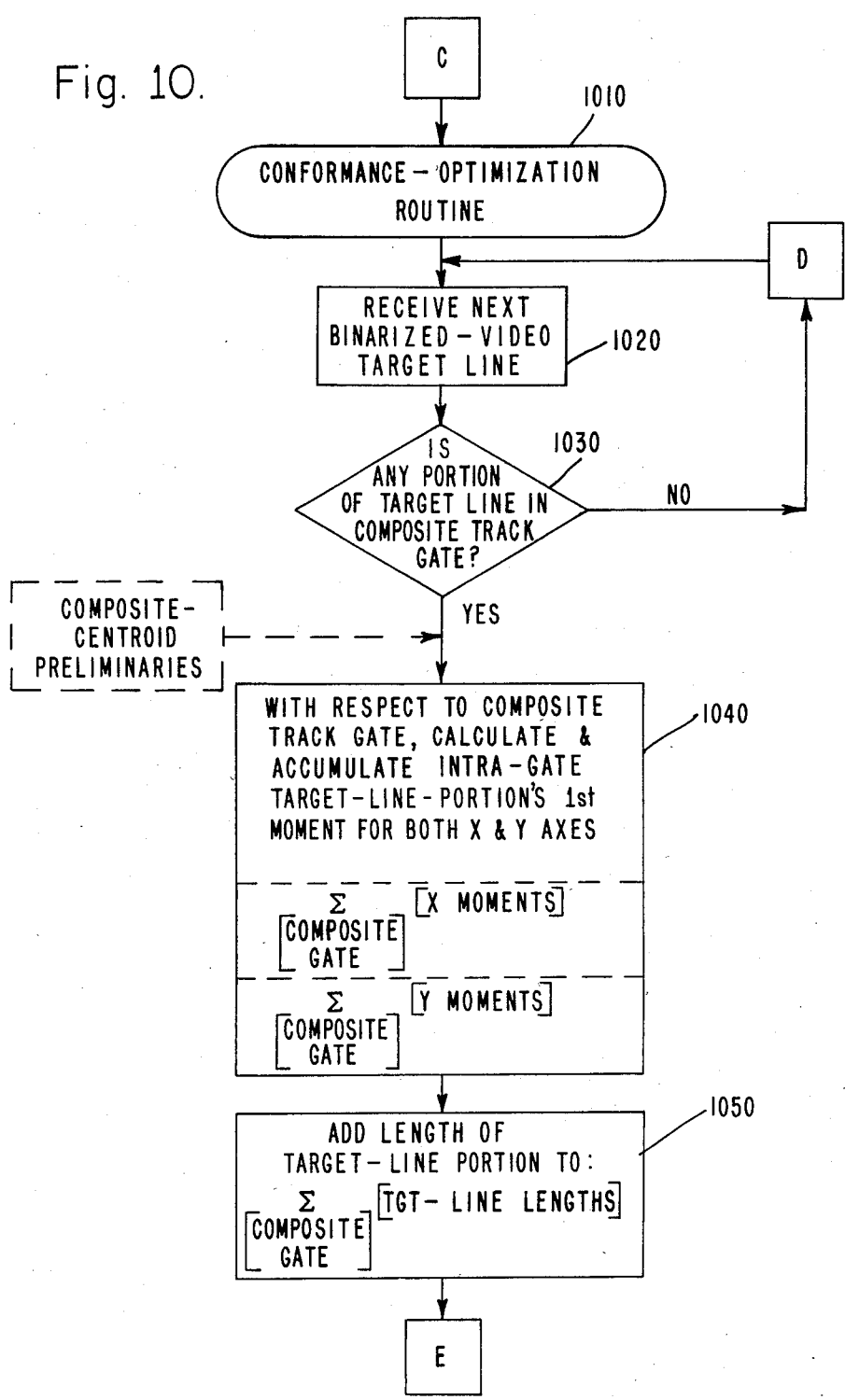

At point "C" of the program in FIG. 10, the conformance-optimization routine would begin following header 1010. At box 1020 would begin the process of analyzing each line of the applied image field to ascertain whether any non-zero image data appears within the existing composite gate. Subsequent processing in this portion of the computer program is then performed on an individual-line basis with respect to any such non-zero image portion found to be within the composite gate. The intra-gate test itself is performed at box 1030. If no portion of the given line possess non-zero image components within the track gate, the processing returns to point "D" after which the next field line is tested. An affirmative answer at box 1030 leads to calculations which are preliminary to the determination of the composite centroid.

As is well known, conventional centroiding calculations involve a fractional quantity whose numerator entails the summation of moments and whose denominator entails the summation of total centroided area. In box 1040 is performed, on a line-by-line basis, the required numerator-moment summation for the respective X and Y axes, while through the operation of box 1050 is ultimately accomplished the required summation of centroided area for the case of a two-dimensional object such as the image of interest.

Figure 11:
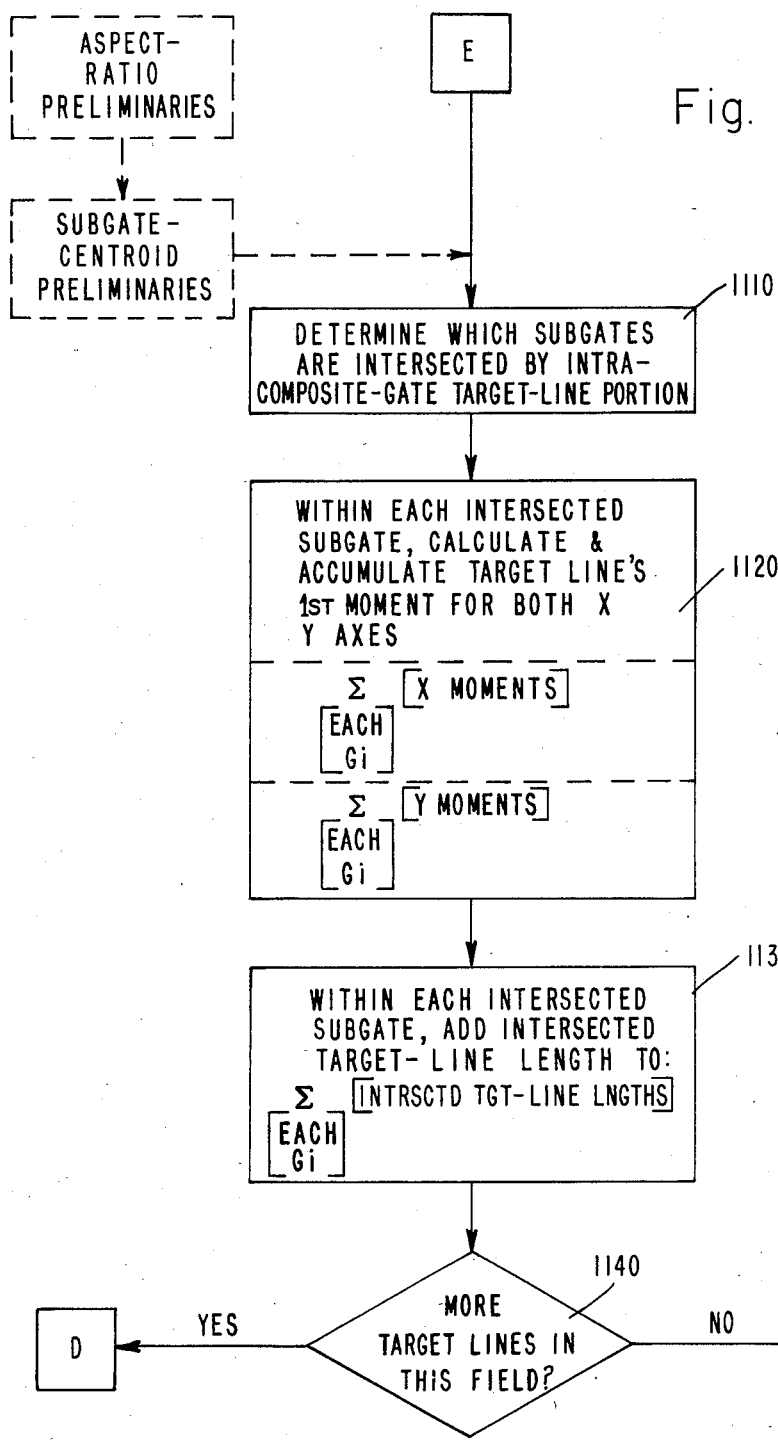

At point "E" of the program in FIG. 11, calculations preliminary to the aspect-ratio determinations begin with a set of calculations which are in turn preliminary to the ascertainment of the local centroids of whatever image data is contained within the individual subgates. Thus, at box 1110, a determination is made as to which subgates are intersected by any target-line portion which has previously been determined to be within the composite gate. For any such intersecting portion, there is then performed in boxes 1120 and 1130 a set of calculations which are analogous to those performed at boxes 1040 and 1050 of FIG. 10. The FIG. 11 calculations are made with respect to the individual subgates, whereas those of FIG. 10 are made with respect to the composite centroid of the overall composite tracking gate.

At box 1140, a determination is made as to whether the final field line of the given applied image has been reached. If not, the next line is then analyzed. If the end of the field has been reached, the program proceeds to point "F." It may be noted parenthetically that an operational program would contain appropriate safety mechanisms such that the aberrant situation in which an applied field contained no image data within the composite gate would be accommodated with appropriate exit mechanisms.

Figure 12:
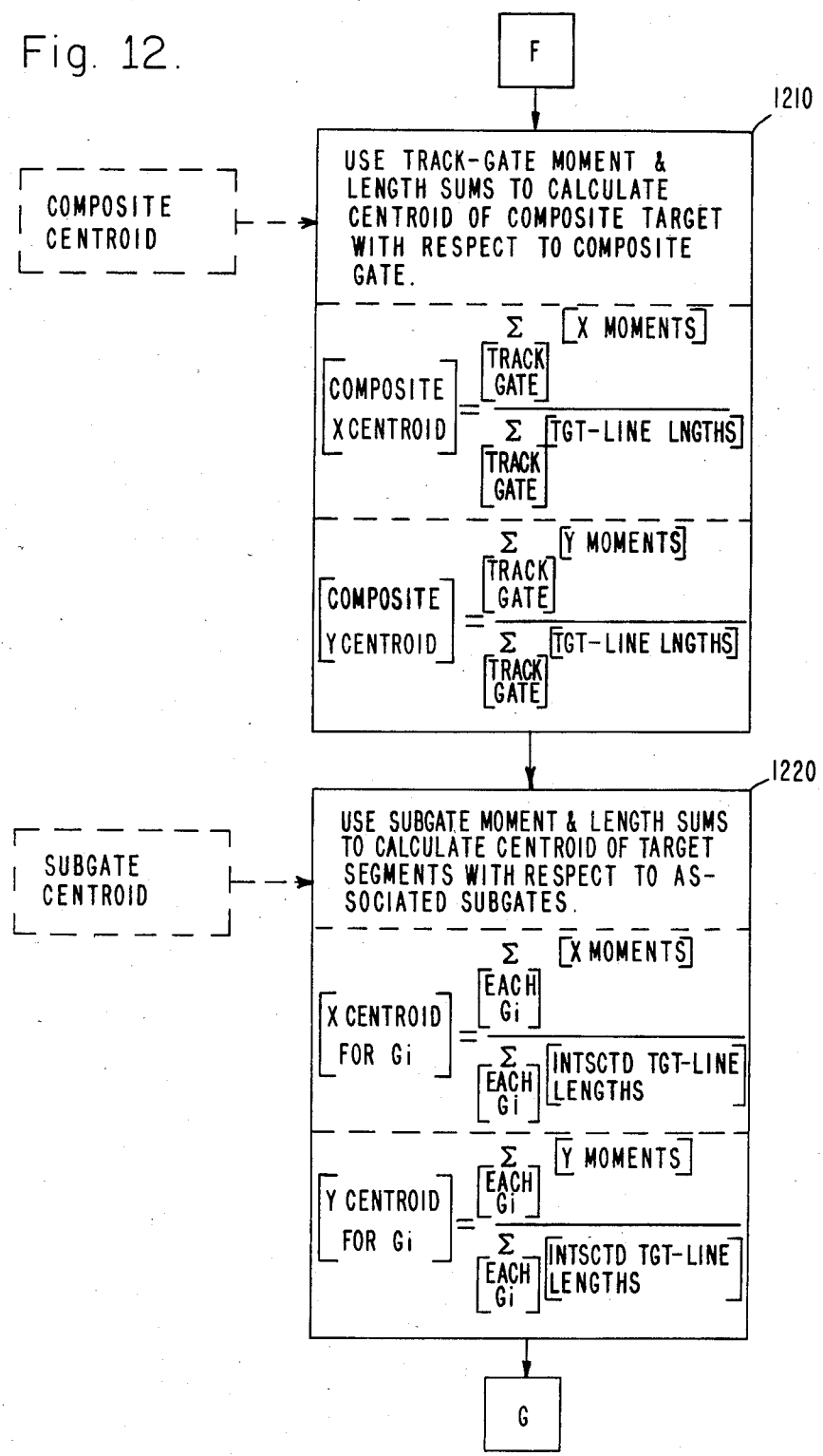

At point "F" of the program in FIG. 12, the actual centroid calculations are performed. For eventual use as the updated aimpoint, the composite centroid is calculated in box 1210 utilizing the previously-accumulated moment and target-line sums with respect to the composite gate. In box 1220 an analogous calculation is performed with respect to the individual subgates.

Figure 13:
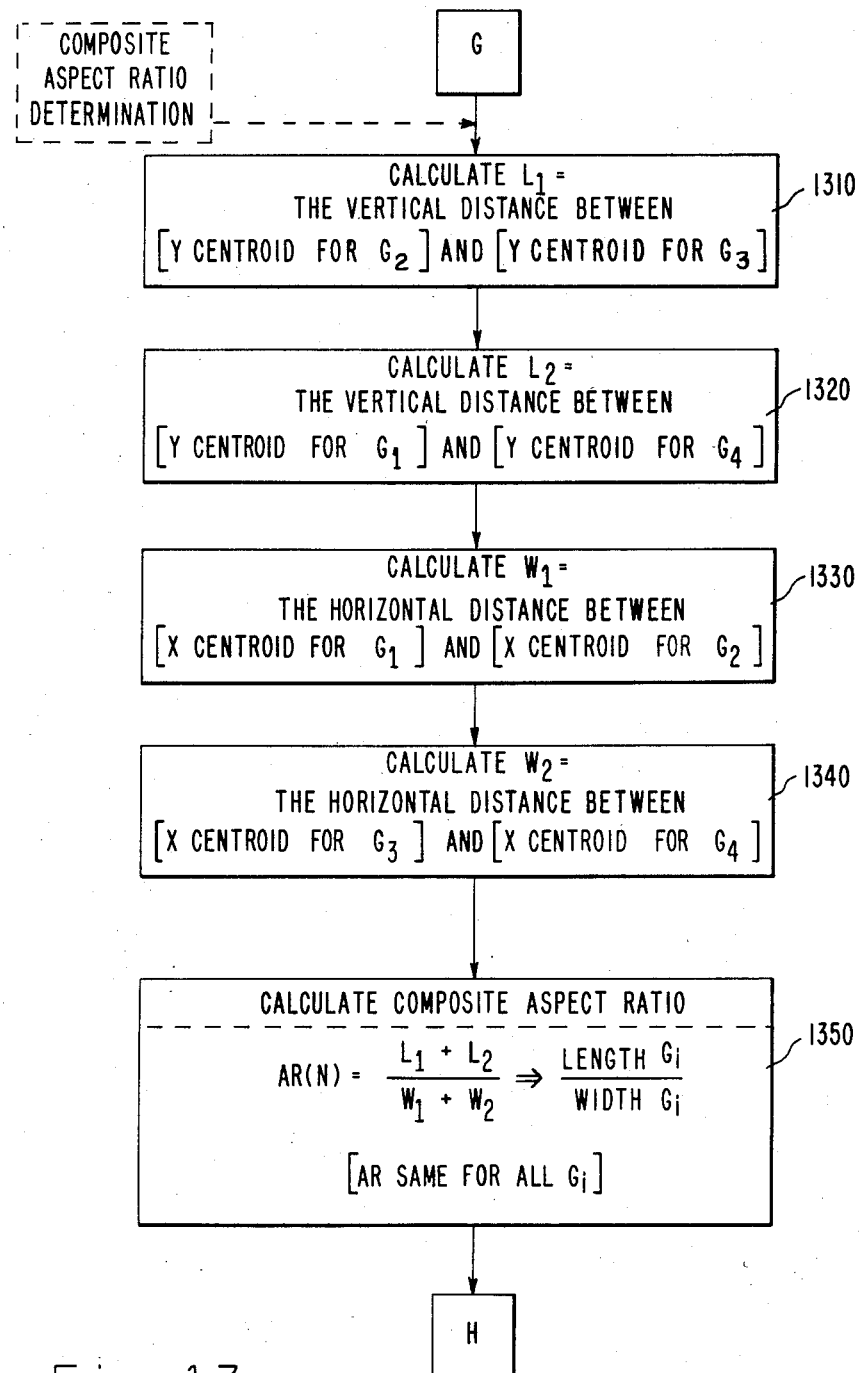

When point "G" of the program is reached in FIG. 13, the computational foundations have been set for determining the quantities to be utilized in the preferred form of the composite-aspect-ratio determination. In boxes 1310 through 1340, conventional procedures are utilized to calculate the indicated intra-coordinate-system distances between the appropriate subgate centroids. At box 1350, the aspect ratio itself may then be calculated. This aspect ratio will eventually be utilized as the indicator of the ratio of the length of a given subgate to its width, a ratio which in accordance with principles set forth in previous-discussed portions of the specification will be the same for all of the subgates. (The rationale for the subscript N for the aspect ratio resulting from the analysis of a given field will be explained in conjunction with FIG. 14.)

Figure 14:
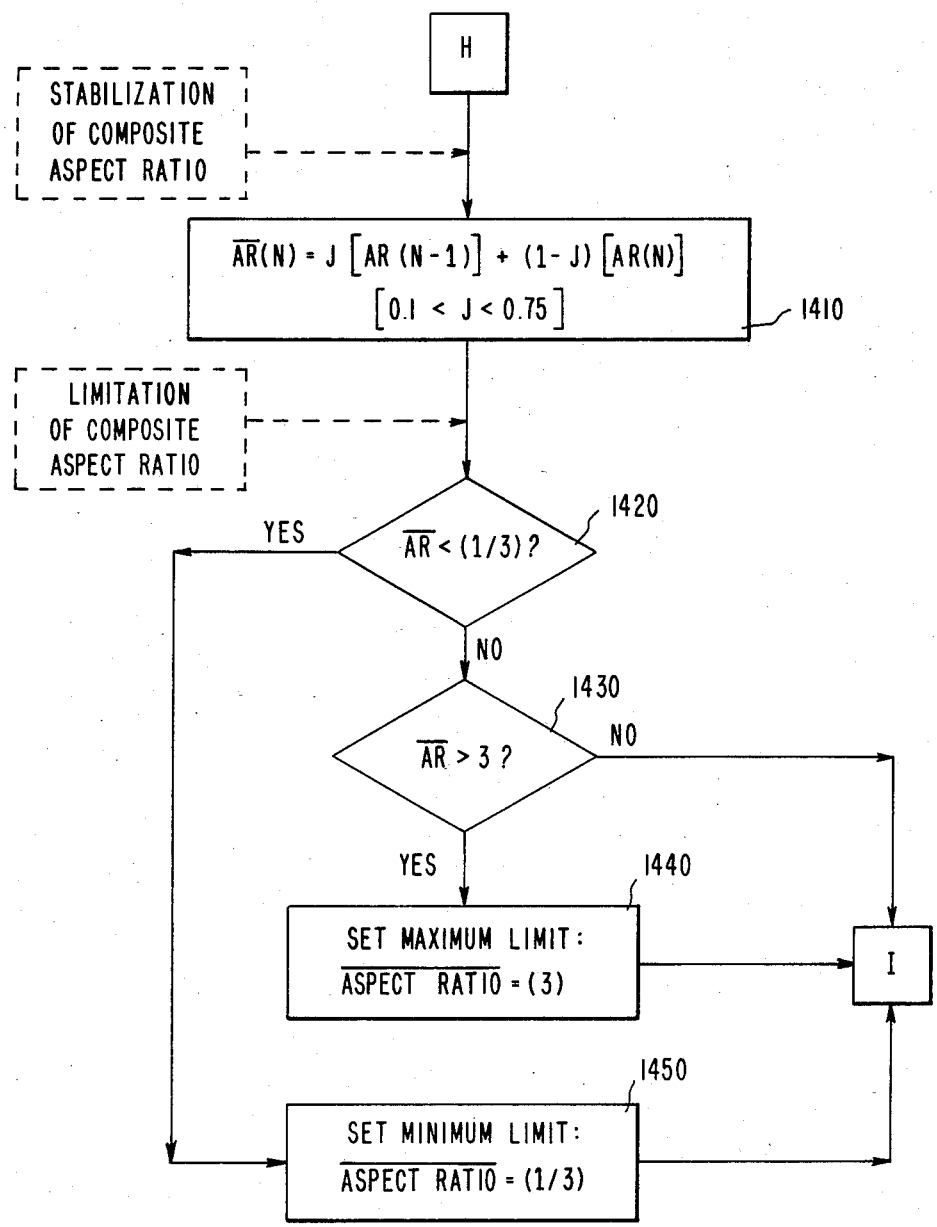

At point "H" of the program presented in FIG. 14, two types of controls are imposed on this newly-calculated ratio. The calculation at box 1410 causes the current ratio to be modified in accordance with a linear combination of the most-recent previously-calculated ratio and the ratio which was produced in the computations just described. The aspect ratio with the subscript N identifies the ratio resulting from the processing of the currently-applied image, while the subscript (N−1) identifies the previously-determined ratio. The net effect of the depicted linear combination is to stabilize the new ratio by preventing an excessively-rapid change from one ratio to the next. The empirically-ascertained combination factor J regulates the proportionate contribution by the previous and present ratios. It is apparent that small values of J will minimize the contribution from the previous ratio and thus allow a relatively more-rapid change from that ratio to the present one. Conversely, larger values of J will tend to cause the previous ratio to be more-heavily weighted, thus minimizing the effect of any change in a newly-computed ratio.

The ratio limitation brought about through the operation of boxes 1420 through 1450 is in the nature of a proportionality control between the dimensions of the individual subgates. In the implemented operational environment where the described program was actually utilized, it was found advantageous to allow no more than a 3-to-1 discrepancy between subgate dimensions. This limitation had the practical effect of preventing the subgates from becoming unreasonably extended in various kinds of operational situations encountered in actual practice.

Figure 15:
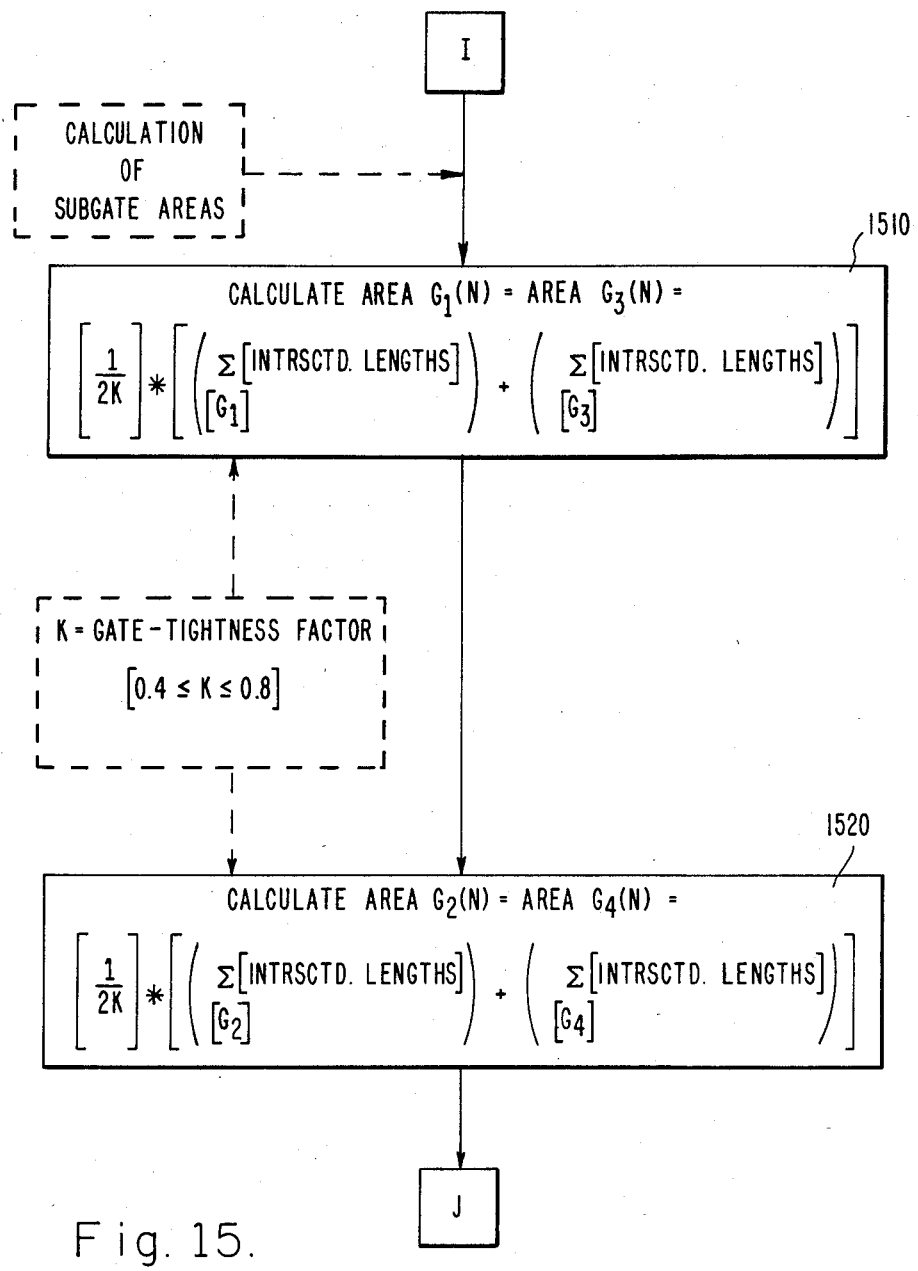

At program point "I⇌" presented in FIG. 15, the calculation of the subgate areas is performed. The calculations indicated in boxes 1510 and 1520 implement both the constraint concerning area equality in diagonally-disposed subgates as well as the constraint concerning the opimizing-fractional relationship between the sums of the areas of the diagonal gates and the sums of the areas of the associated target-segments. As discussed previously, the gate-tightness factor K will typically be an empirically-determined quantity lying within the interval from about 0.4 to about 0.8.

Figure 16:
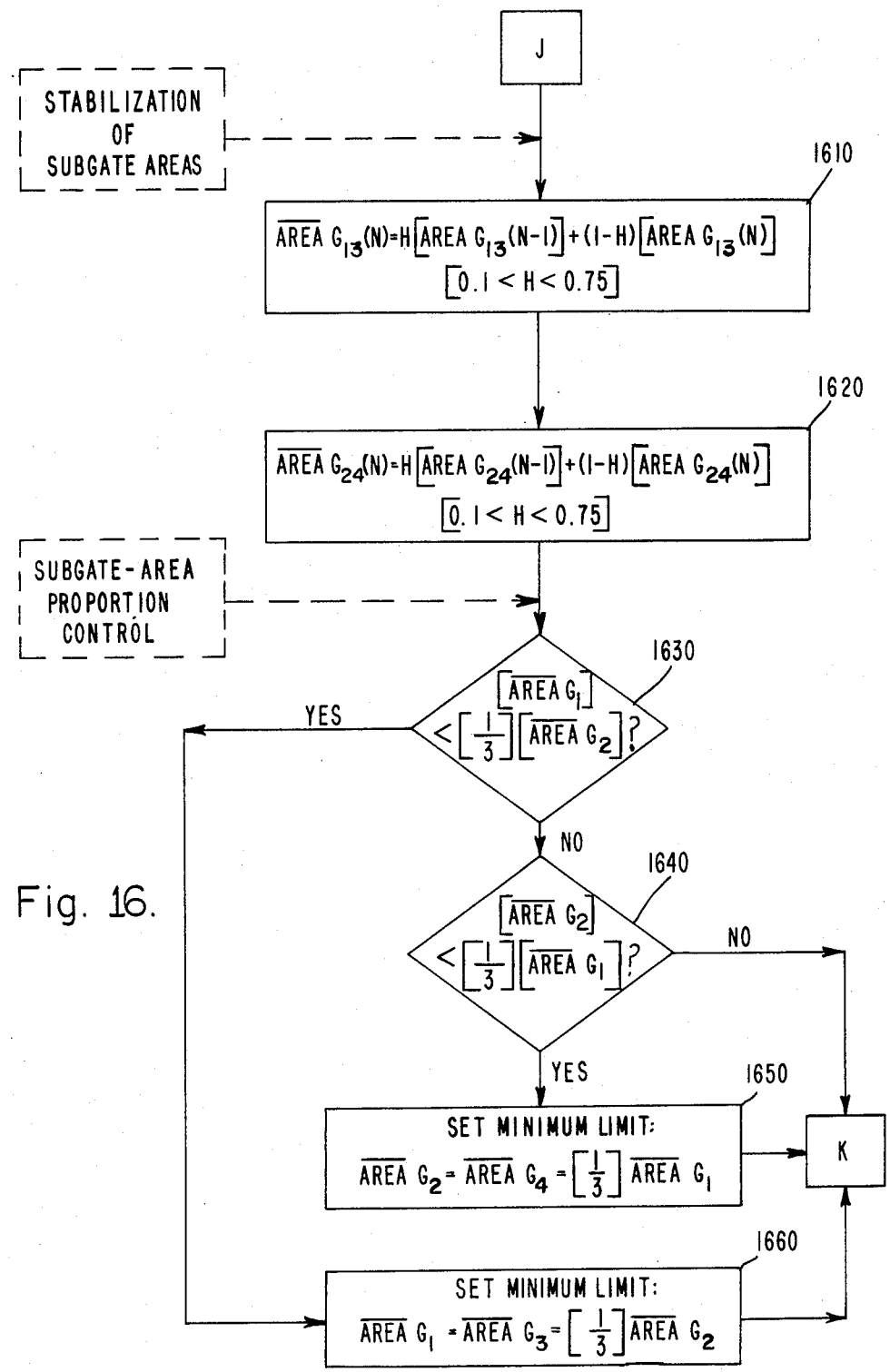

The control operations performed with respect to the subgate areas as illustrated at program-point "J" in FIG. 16 are analogous to the controls imposed on the composite aspect ratio as set forth in FIG. 14. The stabilization-factor H will again be a quantity determined empirically in the light of the degree of change permissible from one set of gate areas to the next. It may be noted that the relations presented in boxes 1610 and 1620 respectively take advantage of the stipulated area equalities between diagonally-disposed subgates. Boxes 1630 through 1660 effectuate an empirically-desired degree of proportionality control between the areas of non-diagonally-disposed subgates.

Figure 17:
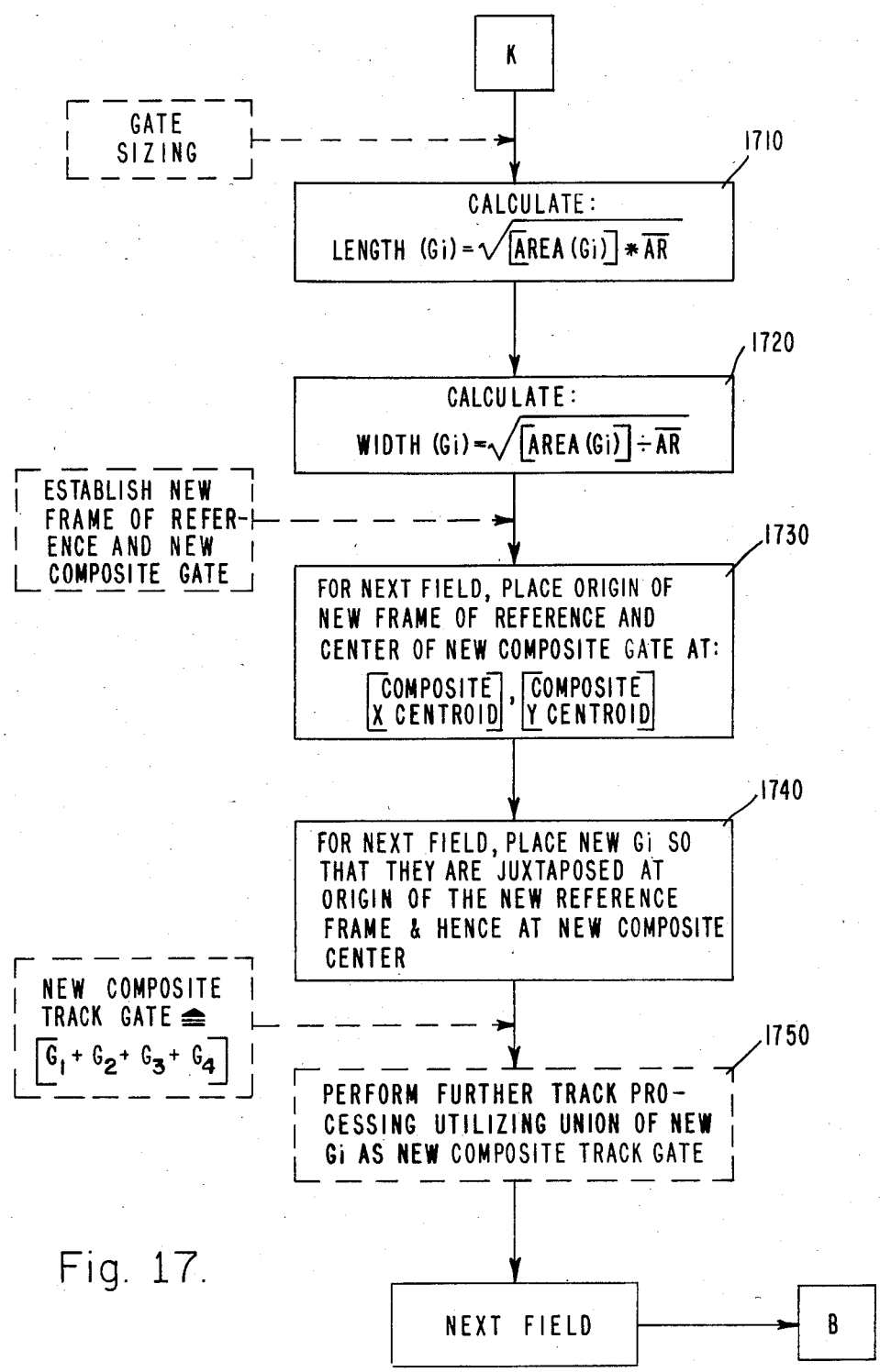

At program point "K" illustrated in FIG. 17, the actual gate sizing is perfomed as indicated by the relations in boxes 1710 and 1720. It will be apparent that these relations utilize elementary equivalencies in which the area of a rectangle is equal to its length multiplied by its width, while the aspect ratio of such a rectangle is equal to its length divided by its width.

The new reference frame and new composite tracking gate are now able to be established. The outputs of the composite-centroid calculations performed previously are utilized at box 1730 to establish the origin of the reference frame which will be utilized in the processing of the next field. As indicated by box 1740, appropriate conventional-processing techniques are utilized to cause the newly-calculated subgates to be configured so that for the processing of the next field the new subgates will be juxtaposed at the origin of the new reference frame and hence at the center of the new composite tracking gate. In accordance with principles previously discussed, this new composite gate will be comprised of the union of the four, newly-calculated individual subgates. As also previously discussed, further track processing, schematically indicated at box 1750, will be performed with respect to this new, composite-gate union. Following the performance of the further track processing, a new image field may be applied for conformance-optimization of its own, with the composite gate to be utilized in the analysis of the newly-applied field thus being that which was derived using the processing of the most-recent previously-applied field.

VII. Claims

The preceding description has presented in detail merely exemplary preferred ways in which the inventive method may be practiced. It will become apparent to those skilled in the art that numerous other alternative techniques encompassing many variations may readily be employed without departing from the spirit and scope of the invention as set forth in the appended claims, in which:

What is claimed is:

1. In an imaging, gated-video tracking system having an ascertained track aimpoint, a method for adaptively sizing the system tracking gate to a target image applied in the vicinity of the aimpoint, this method comprising the steps of:
   (A) establishing, with respect to the aim-point, a four-quadrant frame of reference, with the established reference frame thereby effectively converting the applied image into a composite target comprising the union of four target-segments;
   (B) with respect to the established reference frame, establishing four subgates, one within each reference-frame quadrant, with a composite-tracking-gate union of the four subgates thereby comprising the overall system tracking gate; and
   (C) conformance-optimizing the composite tracking gate with respect to the composite target by conformance-optimizing the subgates with respect to the associated target-segments under the constraint that the aspect ratios of all four subgates are to remain equal.

2. A method according to claim 1 in which:
   (1) the method includes the step of determining the composite image's effective aspect ratio as projected into the established reference frame, with the resulting effective ratio being regarded as a composite aspect ratio of the composite target with respect to the overall frame of reference; and in which
   (2) the conformance-optimization is carried out in accordance with the further constraint that the individual aspect ratios of the subgates are to remain equal to this composite aspect ratio.

3. A method according to claim 2 in which:
   (1) the quadrants and their associated subgates are identifiable as two pairs of vertically-juxtaposed quadrants and subgates and as two pairs of horizontally-juxtaposed quadrants and subgates;
   (2) the method includes the step of determining, as a local centroid within each quadrant, the centroid of the associated target-segment;
   (3) the method includes the step of determining the sum of the vertical distances between the centroids of each of the vertically-juxtaposed subgate pairs, as well as the step of determining the sum of the horizontal distances between the centroids of each of the horizontally-juxtaposed subgate pairs; and in which
   (4) the composite aspect ratio is the quantity which results from dividing the vertical-distance sum by the horizontal-distance sum.

4. A method according to claim 2 in which:
   (1) the method includes the step of determining, as a local centroid within each quadrant, the centroid of the associated target-segment;
   (2) the method includes the step of determining both the maximum vertical distance between any two of the local centroids and the maximum horizontal distance between any two of the local centroids; and in which
   (3) the composite aspect ratio is the quantity which results from dividing the vertical maximum by the horizontal maximum.

5. A method according to claim 2 in which:
   (1) the quadrants and their associated subgates are identifiable as two pairs of diagonally-disposed quadrants and subgates;
   (2) the method includes the step of determining, as a local centroid within each of the quadrants, the centroid of the associated target-segment;
   (3) the method includes the step of determining the centroid-to-centroid distances between the local centroids within diagonally-disposed subgates; and in which
   (4) the composite aspect ratio is the quantity which results from dividing a predetermined one of the diagonal-centroid distances by the predetermined other one of the diagonal distances.

6. In a sequentially-imaging, gated-video tracking system having a repetitively-determined and iteratively-updated track aimpoint, a method for adaptively sizing the system tracking gate to substantially each one of the sequence of sensed-target images, with substantially each such image being applied in the vicinity of a given current aimpoint, and with substantially each such image having an intrinsic aspect ratio and a determinable major axis, this method comprising the steps of:
   (A) establishing at the current aimpoint a four-quadrant frame of reference, this reference frame having horizontal and vertical axes which intersect at the aim-point and which may thereby divide a given applied target image into four, quadrant-based segments, with the union of the resulting segments being regarded as a composite target image, and with the quadrants being identifiable as two pairs of diagonally-disposed quadrants;
   (B) establishing four subgates, one within each quadrant, with all subgates being joined at the origin, and with the union of the four subgates comprising a composite tracking gate;
   (C) for each of the target-segments of the given target image, computing the segment area contained within the associated subgate;
   (D) determining the composite image's effective aspect ratio as projected, both from said intrinsic ratio and from the intrareference-frame rotational orientation of said major axis, into the established reference frame, with the resulting effective ratio being regarded as a composite aspect ratio of the composite target with respect to the overall frame of reference;
   (E) conformance-optimizing the composite tracking gate with respect to the composite target by adjusting the aspect ratios and areas of the individual subgates so that each subgate aspect ratio is the same as the composite aspect ratio, so that the areas enclosed by the subgates in diagonally-disposed quadrants remain equal, and so that the sums of the areas of the target-segments in diagonally-disposed quadrants remain a predetermined optimizing fraction K of the sums of the areas of the associated diagonally-disposed subgates, with K lying within the interval of about 0.4 to about 0.8;
   (F) determining, as a composite centroid with respect to a predetermined one of the resulting sequence of conformance-optimized composite tracking gates, the centroid of that portion of the given composite-target image contained within the predetermined, optimized, composite gate; and
   (G) making the overall system target-tracking gate, with respect to which further track processing is to be performed, congruent with the resulting, conformance-optimized composite tracking gate, and using the determined composite centroid as an updated aimpoint.

7. A method according to claim 6 in which:
(1) the quadrants and their associated subgates are identifiable as two pairs of vertically-juxtaposed quadrants and subgates and as two pairs of horizontally-juxtaposed quadrants and subgates;
(2) the method includes the step of determining, as a local centroid within each quadrant, the centroid of the associated target-segment;
(3) the method includes the step of determining the sum of the vertical distances between the centroids of each of the vertically-juxtaposed subgate pairs, as well as the step of determining the sum of the horizontal distances between the centroids of each of the horizontally-juxtaposed subgate pairs; and in which
(4) the projected composite aspect ratio is equated to the quantity which results from dividing the vertical-distance sum by the horizontal-distance sum.

8. In an imaging, gated-video tracking system having an ascertained track aimpoint, a method for adaptively sizing the system tracking gate to a target image applied in the vicinity of the aimpoint, this method comprising the steps of:
(A) establishing, with respect to the aim-point, a four quadrant frame of reference, with the established reference frame thereby effectively converting the applied image into a composite target comprising the union of four target-segments;
(B) with respect to the established reference frame, establishing four subgates, one within each reference-frame quadrant, with a composite-tracking-gate union of the four subgates thereby comprising the overall system tracking gate;
(C) the quadrants and their associated subgates are identifiable as two pairs of diagonally-disposed quadrants and subgates; and
(D) conformance-optimizing the composite tracking gate with respect to the composite target by conformance-optimizing the subgates with respect to the associated target-segments in accordance with the constraint that the aspect ratios of diagonally-disposed subgates are to remain equal.

9. In an imaging, gated-video tracking system having an ascertained track aimpoint, a method for adaptively sizing the system tracking gate to a target image applied in the vicinity of the aimpoint, this method comprising the steps of:
(A) establishing, with respect to the aim-point, a four-quadrant frame of reference, with the established reference frame thereby effectively converting the applied image into a composite target comprising the union of four target-segments;
(B) with respect to the established reference frame, establishing four subgates, one within each reference-frame quadrant, with a composite-tracking-gate union of the four subgates thereby comprising the overall system tracking gate;
(C) the quadrants and their associated subgates are identifiable as two pairs of diagonally-disposed quadrants and subgates; and
(D) conformance-optimizing the composite tracking gate with respect to the composite target by conformance-optimizing the subgates with respect to the associated target-segments in accordance with the constraint that the subgate areas are to be adjusted so that the sums of the areas of the target-segments in diagonal subgates remain a predetermined optimizing-fraction K of the sums of the areas of the associated diagonal subgates.

10. A method according to claim 9 in which: K lies between about 0.4 and about 0.8.

11. In an imaging, gated-video tracking system having an ascertained track aimpoint, a method for adaptively sizing the system tracking gate to a target image applied in the vicinity of the aimpoint, this method comprising the steps of:
(A) establishing, with respect to the aim-point, a four-quadrant frame of reference, with the established reference frame thereby effectively converting the applied image into a composite target comprising the union of four target-segments;
(B) with respect to the established reference frame, establishing four subgates, one within each reference-frame quadrant, with a composite-tracking-gate union of the four subgates thereby comprising the overall system tracking gate;
(C) the quadrants and their associated subgates are identifiable as two pairs of diagonally-disposed quadrants and subgates; and
(D) conformance-optimizing the composite tracking gate with respect to the composite target by conformance-optimizing the subgates with respect to the associated target-segments in accordance with the constraint that the aspect ratios of diagonally-disposed subgates are to remain equal.

12. A method according to claim 11 in which:
(1) the target-segments with diagonally-disposed quadrants are identifiable as two pairs of diagonally-disposed target-segments;
(2) the method includes the step of determining, for each pair of diagonal segments, the paired-segments's effective aspect ratio as projected into the established reference frame, with each of the resulting effective ratios being regarded as a diagonal aspect ratio of the associated diagonal segments with respect to the overall frame of reference; and
(3) the conformance-optimization is carried out in accordance with the further contraint that the aspect ratios of diagonally-disposed subgates are to remain equal to the diagonal aspect ratio of the associated diagonal target-segment pair.

13. A method according to claim 12 in which:
(1) the method includes the step of determining, as a local centroid within each quadrant, the centroid of the associated target-segment;
(2) the method includes the step of determining the slope of each of the two diagonal lines intersecting the centroids of diagonally-disposed target-segments; and
(3) each diagonal aspect ratio is made equal to the magnitude of the slope of the centroid-intersection line of the associated diagonal-target-segment pair.

* * * * *